(12) United States Patent
Wu

(10) Patent No.: US 7,364,357 B2
(45) Date of Patent: Apr. 29, 2008

(54) THERMOCHROMIC LID FOR COOKWARE

(75) Inventor: Wai Pan Wu, Hong Kong (CN)

(73) Assignee: Meyer Intellectual Properties Limited, Kowloon (HK)

( * ) Notice: Subject to any disclaimer, the term of this patent is extended or adjusted under 35 U.S.C. 154(b) by 90 days.

(21) Appl. No.: 11/235,825

(22) Filed: Sep. 26, 2005

(65) Prior Publication Data
US 2007/0068936 A1    Mar. 29, 2007

(51) Int. Cl.
*G01K 11/00* (2006.01)
(52) U.S. Cl. .................... 374/161; 374/162; 374/141
(58) Field of Classification Search ................ 374/161, 374/162, 141; 116/207, 216
See application file for complete search history.

(56) References Cited

U.S. PATENT DOCUMENTS

| | | | |
|---|---|---|---|
| 3,701,344 A | 10/1972 | Walls et al. | |
| 4,028,118 A | 6/1977 | Nakasuji et al. | |
| 4,509,868 A | 4/1985 | Ronconi et al. | |
| 4,805,188 A | 2/1989 | Parker | |
| 4,933,525 A * | 6/1990 | St. Phillips | 219/725 |
| 5,265,522 A * | 11/1993 | Schultz | 99/343 |
| 5,499,597 A | 3/1996 | Kronberg | |
| 5,720,555 A | 2/1998 | Elele | |
| 6,281,165 B1 | 8/2001 | Cranford | |
| 6,551,693 B1 | 4/2003 | Buffard et al. | |
| 6,979,120 B1 * | 12/2005 | Wolfe | 374/162 |
| 2004/0149720 A1 | 8/2004 | Lerner | |

FOREIGN PATENT DOCUMENTS

| | | |
|---|---|---|
| DE | 8000212 U1 | 5/1980 |
| DE | 4105498 C2 | 5/1992 |
| DE | 20002797 U1 | 9/2000 |
| DE | 20 2004 011 919 U1 | 11/2004 |
| EP | 0837011 A1 | 4/1998 |
| EP | 1447652 A1 | 8/2004 |
| EP | 1530941 A1 | 5/2005 |
| FR | 1388029 | 2/1965 |
| FR | 1393543 | 3/1965 |

* cited by examiner

*Primary Examiner*—Gail Verbitsky
*Assistant Examiner*—Megann E Vaughn
(74) *Attorney, Agent, or Firm*—Edward S. Sherman

(57) ABSTRACT

A lid for article of cookware is covered over a considerable portion of its surface with a thermochromic ink or paint to form a first thermochromic indicator. This first thermochromic indicator undergoes a readily visible change in appearance to notify the cook that the underlying cookware vessel and/or the contents thereof have reached the desired temperature. A second thermochromic indicator on the lid is used to indicate that liquid in the pot is also boiling, or that a certain time has elapsed since the change in appearance of the first thermochromic indicator. The first thermochromic indicator preferably surrounds the second thermochromic indicator and is separated therefrom by a thermal insulator to create or extend the time lag between each indicator reaching their respective thermochromic transition temperatures.

5 Claims, 4 Drawing Sheets

FIG.1A
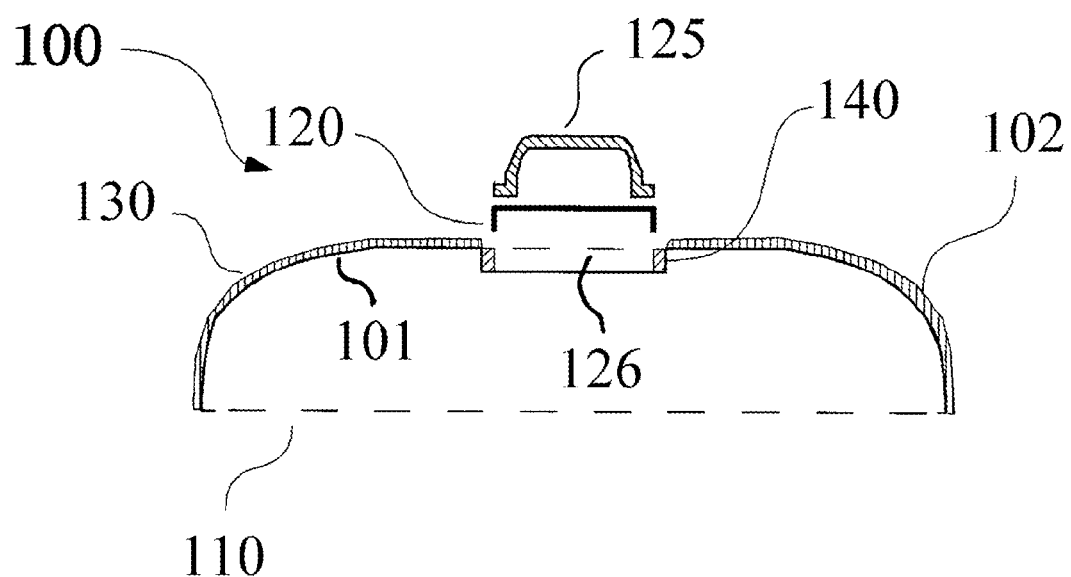
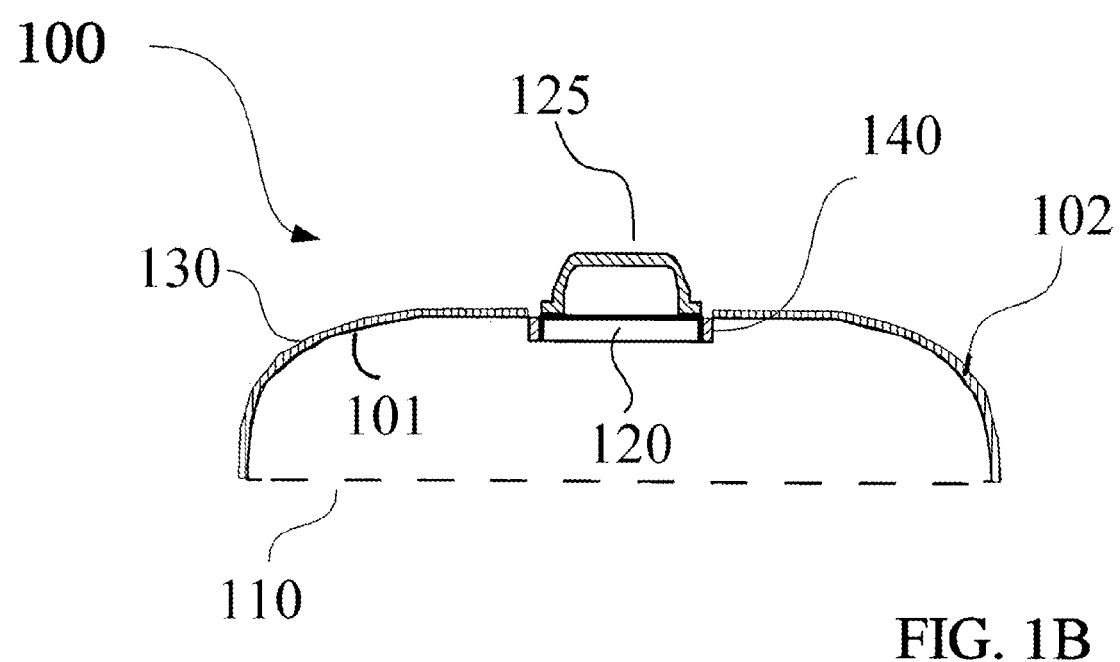
FIG. 1B

THERMOCHROMIC LID FOR COOKWARE

CROSS REFERENCE TO RELATED APPLICATIONS

None

BACKGROUND OF INVENTION

The present invention relates to thermochromic indicators for use in cookware, and in particular to a lid for a cookware vessel.

Thermochromic inks and paints of various compositions are well known for their ability to reversibly change color, or another optical property, upon reaching a predetermined temperature. Such paints or coatings have been applied to cookware vessels to indicate that the pan has reached a suitable temperature for adding foodstuffs, or to indicate that the contents have reached a desired temperature for another phase of cooking, as well as to warn the user and others in the kitchen that the cookware article is hot and should not be touched with the bare hand. For example, U.S. Pat. No. 3,701,344 to Walls et al. (issued Oct. 31, 1972), which is incorporated herein by reference, discloses a cooking apparatus with a knob having an indicator, which by its change in color can enable a cook to manipulate the heat in order to obtain the best results in using waterless cookware. The color changing indicator is a thermochromic paint that embedded within a knob style handle on the lid of the cookware article. A thermally conductive heat sink within the knob style handle conducts heat from the lid to the thermochromic paint, which is visible through a clear window at the center of the knob. This initial color change within the knob is intended to indicate when heat should not longer be applied to the waterless cookware article. Then, the return of the knob to the original temperature on cooling is intended to indicate when the food is cooked by the residual steam retained in the waterless cookware vessel.

U.S. Pat. No. 4,805,188 to Parker (issued Feb. 14, 1989), which is incorporated herein by reference, discloses a time-temperature indicator, particularly adapted for use with closed sterilizing or cooking vessels to indicate at what temperature and for how long material contained within the vessel has been heated or is cooking. The indicator deploys a thermochromic coating on a thermally conducting cylinder or similar shaped object having one end in thermal contact with the lid of the cooking vessel. This thermally conductive cylinder is surrounded by a transparent thermally insulating material such that as heat is conducted up the cylinder from the lid an ever increasing area of the thermochromic coating thereon will change color in proportion to the time that the lid was at or above the thermochromic transition temperature. The thermochromic coating will be visible through the surrounding transparent thermally insulating material. The indicator may be constructed as a knob on the lid of a pressure cooker or sterilizer or may be attached to replace an existing knob. While the device can be constructed to provide readings with the full 360° angle around the knob or indicator, the user is still require to focus their attention on a relatively small area of the cookware article.

In addition, U.S. Pat. No. 5,720,555 to Elele (issued Feb. 24, 1998), which is incorporated herein by reference, discloses a temperature indicating container and lid apparatus. According to the disclosure of the '555 patent, the temperature indicating container apparatus includes an inner container portion made from substantially heat insulating material. A thermochromic-substance-containing portion is juxtaposed against an outside surface of the inner container portion, such that color changes of the thermochromic-substance-containing portion can be seen from outside the inner container portion. The thermochromic-substance-containing portion may be in a form of a jacket around the outside surface of the inner container portion. The jacket may include a plurality of windows. An outermost container portion may be located outside both the thermochromic-substance-containing jacket and the inner container portion. The outermost container portion is light transmissive such that color changes of the thermochromic-substance-containing jacket can be seen from outside the outermost container portion. A lid assembly includes a lid portion for covering the inner container portion and the thermochromic-substance-containing portion. The patent discloses that the lid portion may include thermochromic substances. As the container itself is thermally insulating, it is not suitable for use as an article of cookware that is externally heated. Further, the aforementioned lid and lid assembly are generally specific to either a particular pot, cooking technique or thermally insulating container.

FR1388029 teaches the attachment of a thermochromic indicator spot on the inner cooking surface of a frypan. The spot changes color at a predetermined temperature to indicate to the cook or user than the pan is hot enough and that food stuffs to be cooked should be inserted. U.S. Pat. No. 6,551,693 to Buffard et al. (issued Apr. 22, 2003), which is incorporated herein by reference, similarly discloses a cooking container, having an inside surface coating including a decoration which changes color as a function of temperature. The decoration is based on a thermostable resin and a chemical substance which changes color as a function of temperature. This decoration is applied over a fluorocarbon resin coating on the inside of the container. However, the color changing devices of FR1388029 and the '693 patent require the cook or user to stand over the cooking vessel to inspect the thermochromic spot or decoration. Such spot or decoration does not indicate when the food is cooked, and in fact would be obscured when the foodstuffs are added to the pan or cookware article.

SUMMARY OF INVENTION

In light of the aforementioned deficiencies in the prior art, it is therefore a first object of the present invention to provide a highly visible indicator that the lid of a pan is hot, and should not be touched with the bare hand.

It is a further object of the invention to provide a simple means for indicating from afar that the article of cookware is both ready, that is at a sufficient temperature, for receiving foodstuffs, and that the foodstuffs are cooked.

It is a further objective of the invention to provide the aforementioned means in a device that can be interchanged for use with different cooking vessels and different cooking methods.

In the present invention, the above and other objectives are achieved by applying a thermochromic paint to the lid of an article of cookware so that the user can observe from afar the gradual change in color from the rim portion of the lid toward its center as the cookware article is heated.

Other objectives are achieved by providing a lid for an article of cookware that has a first thermal indicator in the center of the lid surrounded by a second thermal indicator that is a thermochromic paint preferably applied to the remaining outer surface of the lid.

Yet further objectives are achieved in additional embodiments in which the first thermal indicator in the center of the lid is at least partially thermally insulated from the remainder of the lid that is covered by the second thermal indicator such that their will be a predetermined time delay from when the food in the pan reaches a first cooking temperature and when the thermochromic indicator reaches the same temperature.

In another embodiment of the present invention, a lid for an article of cookware has a first and a second thermochromic indicator on different portions of the lid, the second thermochromic indicator requiring a higher temperature to change color than the first thermochromic indicator. The change in color of the two indicators provides a predetermined time delay from when the food or pan reaches a first cooking temperature associated with the first indicator and when the pan reaches a second temperature associated with the second thermochromic indicator.

The above and other objects, effects, features, and advantages of the present invention will become more apparent from the following description of the embodiments thereof taken in conjunction with the accompanying drawings.

BRIEF DESCRIPTION OF DRAWINGS

FIG. 1A is a cross-sectional elevation of the exploded components of a cookware lid deploying the instant invention.

FIG. 1B is a cross-sectional elevation of the assembled components of the cookware lid of FIG. 1A.

DETAILED DESCRIPTION

Figure 2:
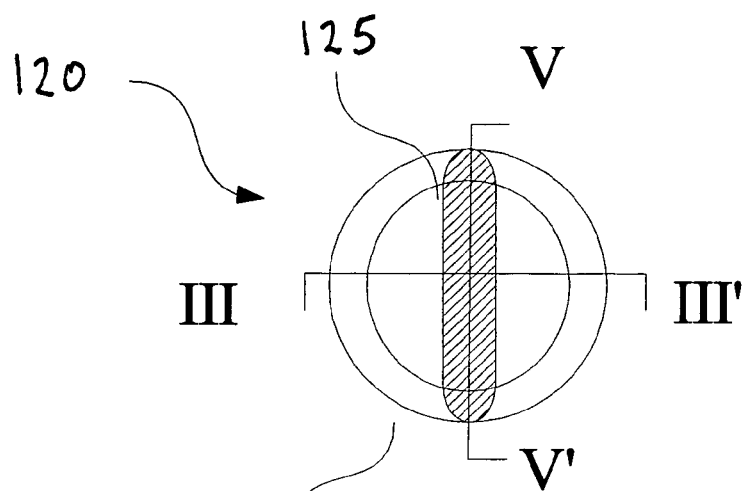
FIG. 2 is a plan view of the central portion of the cookware lid of FIG. 1 in a first state at a first temperature.

Referring to FIGS. 1 through 6, wherein like reference numerals refer to like components in the various views, there is illustrated therein a new and improved thermochromic lid for cookware, generally denominated 100 herein.

In accordance with the present invention, the thermochromic lid 100 extends to a substantially circular lower rim 110 for sealed engagement with the upper and open end of a cooking pan or fluid enclosing vessel. Thermochromic lid 100 is preferably formed from a metal sheet by conventional forming operations such that the inner surface 101 presents one side of the metal sheet used to form the lid 100. The outer surface 102 of thermochromic lid 110 comprises a central indicating medallion 120, which is straddled by an upward extending handle 125. As shown in further detail in FIG. 5, handle 125 is secured to both the lid and medallion, via rivets 123 disposed at opposite sides of the U-Shaped 125.

The region of thermochromic lid 110 surrounding central medallion 120 is covered with a layer of thermochromic indicating paint 130. The thermochromic paints, inks or related indicator coatings preferably undergo a visible transition from the first state to the second state at a temperature of about 150-158° F. Numerous thermochromic materials that undergo sharp, reversible visual metachromism in response to temperature changes are known in the art. Such materials are optionally based on both inorganic materials and organic materials including various forms of encapsulated liquid crystals. For example, U.S. Pat. No. 4,028,118 issued to Nakasuji et al., which is incorporated herein by reference, discloses such a material. Typically, these materials contain, as indispensable components, an electron-donating, chromatic organic compound, a compound having a phenolic hydroxyl group, and a compound selected from the group consisting of higher aliphatic monatomic alcohols and higher aliphatic monatomic acid alcohol esters. The '118 patent further discloses that the thermochromic characteristics of such a thermochromic material can be further improved when it is occluded in fine microcapsules having a size not exceeding 50 microns and that thermochromic polymers, thermochromic printing inks, thermochromic writing instruments, thermochromic paints and thermochromic sheets having excellent thermochromatic characteristics and wide utility can be prepared from such a thermochromic material or microencapsulated thermochromic material.

Inorganic thermochromic paint compositions suitable for use at higher temperatures, are disclosed in U.S. Pat. No. 5,499,597 to Kronberg (issued Mar. 19, 1996), which is incorporated herein by reference. More specifically, the '597 patent discloses reversible optical temperature indicators that utilize inorganic semiconductors which vary in color in response to various temperature levels. The semiconductor material is enclosed in enamel, which provides protection and prevents breakdown at higher temperatures. U.S. Pat. No. 6,551,693, mentioned above, discloses iron oxide alone as an additive to convert a thermostable resin resistant (preferably one stable to temperatures up to at least 200° C.) into a thermochromic resin. The thermoplastic resin is described as being preferably a fluorocarbon resin or a mixture of exclusively fluorocarbon resins or of fluorocarbon resins mixed with other thermostable resins. As an alternative to using iron oxide alone, iron oxide can be mixed with other pigments or coloring agents, such as perylene red bonded to a black pigment. A current commercial sources for thermochromic inks and paints is Chromatic Technologies, Inc., 4870 Centennial Blvd. Ste. 126, Colorado Springs, Colo. 80919

In a preferred embodiment of the instant invention, the central medallion 120 is inset into a cavity 126 formed in thermochromic lid 100. Thus, handle 125 and rivets 123 further secure medallion 120 within cavity or pocket 126 formed in the metal sheet. It should be appreciated that the invention is not solely limited in this embodiment to a U-shaped handle, as a knob-type handle can also be deployed to secure medallion 120 within pocket 126. A rubber liner 140 partially thermally isolates central medallion 120 from the surrounding portion of the metal outer surface 102. Medallion 120 is a disk with downward extending sidewalls 127 having a visual thermal indicator, such as a thermochromic paint, ink, or display on the outer surface 128. In the preferred embodiment shown in FIG. 2-4, the indicating region on the medallion 120 comprises an annulus 150 at the outer edge of the medallion 120. The annular region may itself be the same, or a different, thermochromic paint layer 130 than that applied to the surrounding portion of the outer surface 102 of lid 100.

Figure 3:
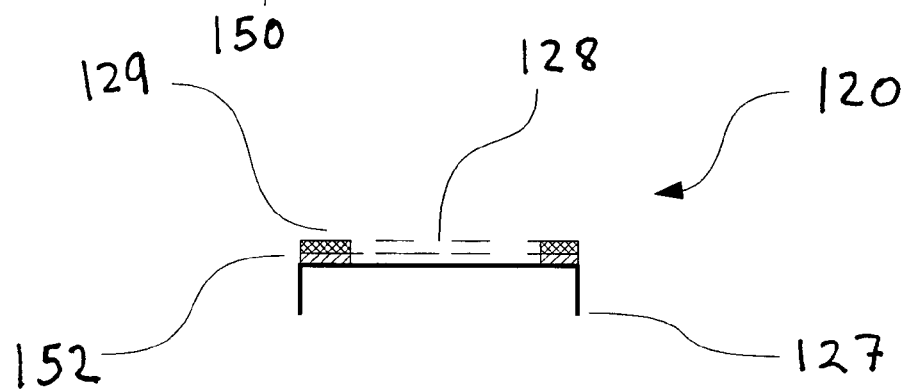
FIG. 3 is a section through the central portion of the lid in FIG. 2 at line III-III'.
Figure 4:
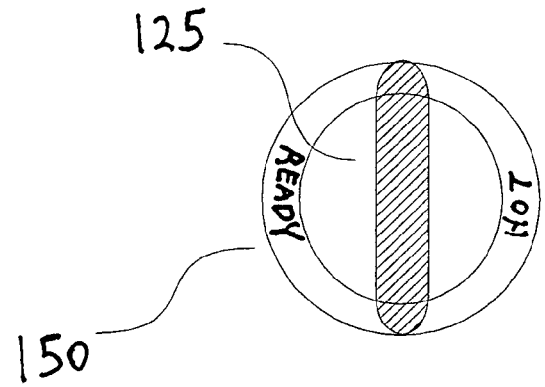
FIG. 4 is a plan view of the central portion of the cookware lid of FIG. 1 in a second state at a second temperature.
Figure 5:
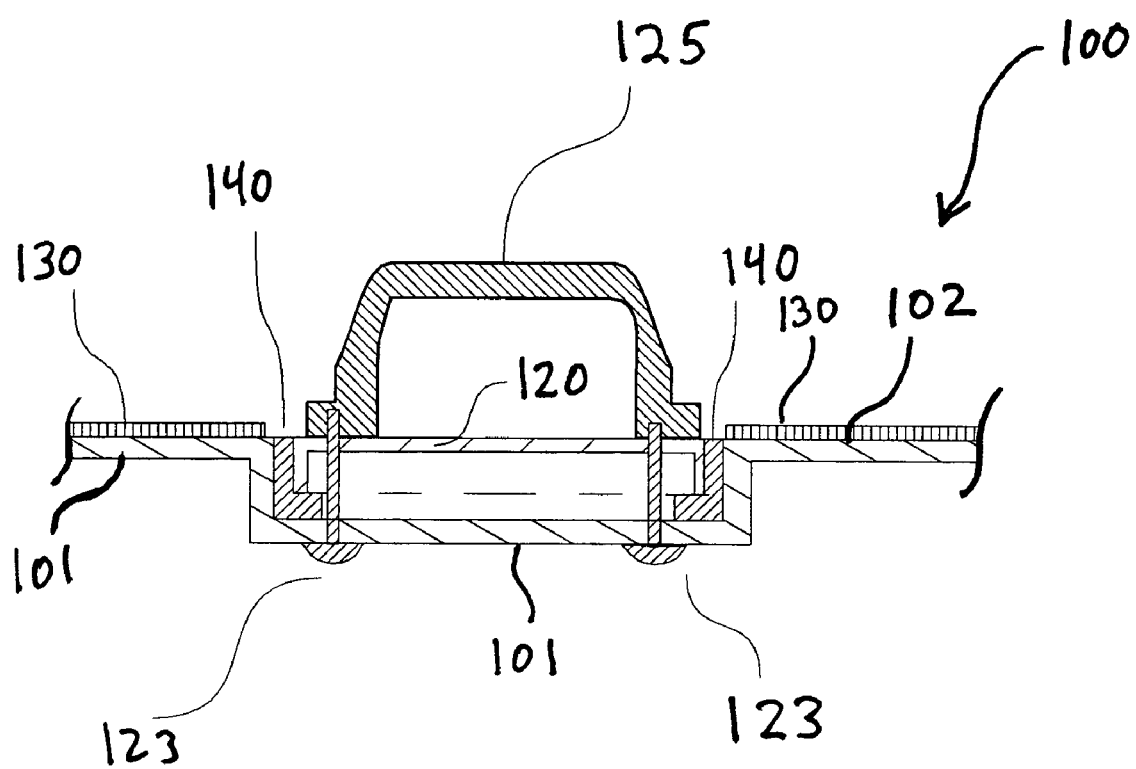
FIG. 5 is a section through the central portion of the lid in FIG. 2 at line V-V'

In more preferred embodiment, illustrated in cross-sectional elevation in FIG. 3, the annular indicating region 150 has a bottom layer 152 of printed indicia on the upper surface 128 of medallion 120. Bottom layer 152 is in turn covered by a thermo-responsive coating 129 that is opaque below a first temperature, being in a first state, but transforms to an optically transparent, or at least translucent, or second state above the first temperature. Alternatively, the annular region, or for that matter any portion of the medallion, may be covered with a thermochromic paint or ink that changes from one color to another color upon exceeding a transition temperature.

In the instant invention, the rubber lining 140 acts in one aspect acts as a seal between the medallion 120 and the lid 100, to prevent water and dirt from entering between the medallion 120 and the top of the lid. More significantly, rubber lining 140 is a thermal insulator as compared to the metal used to form thermochromic lid 100 and medallion 120. Thus, when thermochromic lid 100 is used to cover a pan in which fluid, such as water, stock or cooking oil (as well as foodstuffs) are being heated, the portion of the lid 100 surrounding medallion 120 will heat faster by conduction from the rim 110, where it physically contacts the underlying pan, than it does from radiation and convection from the heated contents. It is preferable to select thermochromic paint in layer 130 to have a lower transition temperature than the thermo-responsive coating 129, or other visual thermal indicator such that the larger area covered by paint 130 first changes color.

Thus, owing to the thermal insulating rubber lining 140 there will be a temperature lag between the thermochromic paint 130 surrounding medallion 120 and the thermal indicator on medallion 120. The temperature lag will result in a time lag between when the thermochromic paint 130 changes color and the thermal indicator on the medallion changes state. This provision of two thermal indicators on different portions of the same lid provides at least two modes of use. In the first mode, lid 100 covers a frying pan to indicate or alert the user, from the color change of paint 130, that frying pan (or pan and previously added oil) have reached the proper temperature to start cooking food. This aids the cook in avoiding excess smoke or burning of the oil, as well as potential oil spatter when the lid is removed to view the contents.

In a second mode of the use, lid 100 is used to cover a stockpot filled with water, broth or a comparable liquid foodstuff. It should be appreciated that in cooking many foods, such as pasta, the stockpot is generally not ready for use, i.e. the adding of solid ingredients, until the contained liquid actually boils. The metallic portion of the lid 100 covered with thermal indicating paint 130 will tend to heat first from conductive heat transfer from the hot pan and then from the convection and radiation of heat from water vapor before the water starts to boil. As the conductive heat transfer from the lid dominates the heating process until the water is about to boil, the thermochromic paint on the lid will gradually change color starting at the rim 110 before moving upward toward the central handle 125. However, the thermal indicator on the central medallion, being thermally insulated from the surrounding lid portion 102, will not actually change appearance or color until the water starts to boil, providing a time lag of at least 30 sec., but possibly up to several minutes. Thus, the cook will be alerted by the initial color change around the rim portion 110 of the lid 100 (along with the gradual progresses of the color change toward handle 125) that the water is almost boiling. Accordingly, the cook need not repeatedly uncover the stockpot to see if the water has actually boiled (which would tend to fill the kitchen with steam as well as cool down the liquid), but merely wait until the central medallion has changed state before uncovering the pot and adding additional ingredients.

It should be appreciated that the surrounding region of lid 100 is readily observable anywhere in the kitchen, as opposed to prior art devices, the cook or user does not need to glance at a specific region of the cookware article or handle to realize that a critical temperature is reached and that the lid is hot. Thus, another benefit to the consumer is that everyone in the kitchen is warned that the lid is hot, and should be held by the handle to avoid being burned.

Once the heat or power applied to the cookware is turned off, or removed, the thermochromic lid 100 will eventually cool and change back to the color observed when it was previously at room temperature. Thus, another benefit to the consumer is that they can discern readily from a distance not only that the fry pan or stock pot is ready to use, but also that cooked food is likely still warm; when the lid has not yet cooled down enough to revert to the original color. Further, the readily observable color change can also serve as a safety warning that the heat or power to the cookware has been left on after cooking is complete. Thus, the thermochromic indicating lid 100 offers the consumer the benefits of convenience as well as household safety.

Figure 6:
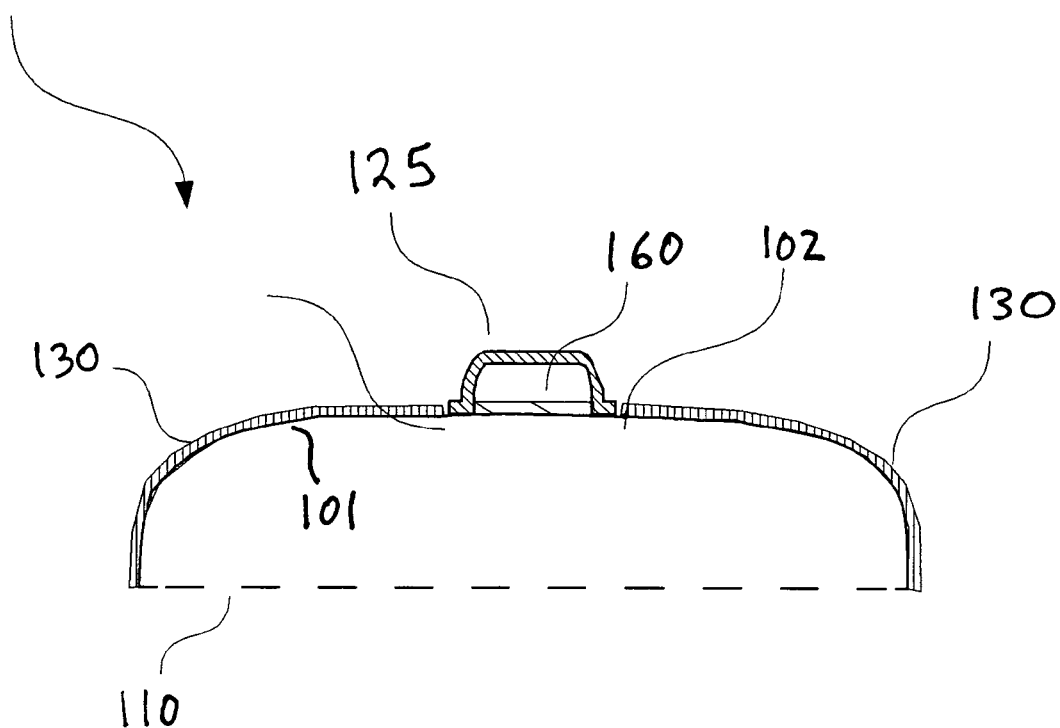
FIG. 6 is a cross-sectional elevation of the assembled components of the cookware lid according to another embodiment of the invention.

FIG. 6 illustrates another embodiment of the invention in which thermochromic lid 100 extends to a substantially circular lower rim 110 for sealed engagement with the upper and open end of a cooking pan or fluid enclosing vessel. Thermochromic lid 100 is preferably formed from a metal sheet by conventional forming operations such that the inner surface 101 presents one side of the metal sheet. An upward extending handle 125 is attached to the outer surface 102 at the center of the lid 100. The lid comprises a first region covered with a layer of a first thermochromic indicating paint 130. A second region 160, under or around handle 125, is covered with a second thermochromic paint, ink or indicator. Preferably, region 130 having the first thermochromic paint surrounds the second region 160 such that both regions are readily visible independent of orientation of the lid on the cooking vessel with respect to the cook or others in the kitchen.

At least one of the first or second thermochromic paints or indicators undergoes a change in appearance or color at a higher temperature than the other paint or visual indicator. Thus, upon heating an article of cookware covered by lid 100, a portion of the lid will undergo a first color change to indicate to the user that the pot is hot or being heated, and depending on the circumstances of use, that foodstuffs should be added. Then, depending on the selection of the second thermochromic paint or indicator, another portion of the lid will change appearance as the pan continues to heat. The change of the second thermochromic paint or indicator can serve as an indication that a particular time has transpired such that the added foodstuffs are likely to have been cooked, or that water added to the pan is already boiling so that the initial foodstuffs, such as pasta, can be added.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

The invention claimed is:

1. A lid for an article of cookware, the lid comprising:
    a) a first thermochromic indicator disposed on a first region of the exterior surface of the lid,
    b) a second thermochromic indicator disposed on a second region of the exterior surface of the lid,
    c) a thermal insulator separating the first and second thermochromic indicators whereby upon heating a cookware article covered by the lid at least one of the first and second thermochromic indicators reaches the thermochromic transition temperature before the other, d) a pocket formed in the outer surface of the lid, e) a medallion inserted into said pocket, wherein the thermal insulator is a rubber gasket lining said pocket and the second region is on the exterior surface of said medallion.

2. A lid for an article of cookware according to claim 1 further comprising a handle having connectors at each end that extend through said medallion and connect to said pocket whereby said medallion is secured within said pocket.

3. A lid for an article of cookware according to claim 1 wherein said first thermochromic indicator undergo a visible transition from the first state to the second state at a temperature of about 150-158° F.

4. A lid for an article of cookware, the lid comprising:

a) a first thermochromic indicator disposed on a first region of the exterior surface of the lid having a first transition temperature, b) a second thermochromic indicator disposed on a second region of the exterior surface of the lid having a second transition temperature, c) a pocket formed in the outer surface of the lid, d) a thermal insulating rubber gasket lining said pocket and separating said first and second thermochromic indicators, wherein at least one of the first and second thermal indicators is disposed in thermal communication with the rubber gasket, e) whereby upon heating a cookware article covered by the lid at least one of the first and second thermochromic indicators changes color upon reaching the respective first or second transition temperature before the other such that the time delay in the other thermochromic indicator changing appearance may be used as a measure of the cooking time.

5. A lid for an article of cookware according to claim 4 further comprising a handle that secures the rubber gasket in said pocket.

* * * * *